(12) United States Patent
Mottes

(10) Patent No.: US 8,532,629 B2
(45) Date of Patent: *Sep. 10, 2013

(54) UNSTRUCTURED SUPPLEMENTARY SERVICE DATA CALL CONTROL MANAGER WITHIN A WIRELESS NETWORK

(75) Inventor: Dorron Mottes, Tel Aviv (IL)

(73) Assignee: VascoDe Technologies Ltd., Tel Aviv (IL)

( * ) Notice: Subject to any disclaimer, the term of this patent is extended or adjusted under 35 U.S.C. 154(b) by 1234 days.

This patent is subject to a terminal disclaimer.

(21) Appl. No.: 12/033,012

(22) Filed: Feb. 18, 2008

(65) Prior Publication Data

US 2008/0139184 A1 Jun. 12, 2008

Related U.S. Application Data

(63) Continuation-in-part of application No. 11/791,176, filed as application No. PCT/IL2005/001246 on Nov. 23, 2005.

(60) Provisional application No. 60/890,546, filed on Feb. 19, 2007.

(30) Foreign Application Priority Data

Nov. 24, 2004 (IL) .......................................... 165362

(51) Int. Cl.
*H04M 3/42* (2006.01)

(52) U.S. Cl.
USPC ..................... 455/414.1; 455/414.2; 455/466; 370/352; 370/351; 370/355

(58) Field of Classification Search
USPC ............. 455/412.1, 412.2, 413, 414.1–414.4, 455/415–420, 422.1, 432.3, 433, 445, 458, 455/466, 517, 518, 550.1, 555, 556.2, 563, 455/566, 567; 379/201.1, 202.01, 205.01, 379/207.01, 211.01, 211.02, 212.01, 215.01; 370/260–262, 264, 310, 312, 352–357; 709/204, 205; 715/753

See application file for complete search history.

(56) References Cited

U.S. PATENT DOCUMENTS 1,791,176 A 2/1931 Topham
2,721,488 A 10/1955 George (Continued)

FOREIGN PATENT DOCUMENTS

EP 0 993 169 4/2000
EP 1 301 056 4/2003

(Continued)

OTHER PUBLICATIONS

European Telecommunications Standards Institute (ETSI) TS 100 549 V7.0.0 (Aug. 1999) Technical Specification, Digital cellular telecommunications system (Phase 2+); Unstructured Supplementary Service Data (USSD)—Stage 2 (GSM 03.90 version 7.0.0. Release 1998).

(Continued)

*Primary Examiner* — Mahendra Patel
(74) *Attorney, Agent, or Firm* — Myers Wolin, LLC

(57) ABSTRACT

A system and apparatus for call control management using the Unstructured Supplementary Service Data (USSD) protocol. The system and apparatus uses USSD messages between the wireless private network subscriber and a wireless network to provide subscribers with information about callers and routing options of the call. The subscriber can also inform the system using USSD messages how to proceed with the call. The system provides USSD messages such as but not limited to, transferring the call to another subscriber with canned messages, transferring the call to a subscriber's voice mail, establishing a conference call, swapping to other call, creating new call, consulting with other person, transferring to specific predefined person, hold, consulting with other person via canned message, etc. The system and apparatus also exchanges device status information using USSD messages.

19 Claims, 10 Drawing Sheets

(56) References Cited

U.S. PATENT DOCUMENTS

| | | | |
|---|---|---|---|
| 2,895,568 A | 7/1959 | Smith et al. | |
| 4,672,658 A | 6/1987 | Kavehrad et al. | |
| 5,329,578 A | 7/1994 | Brennan et al. | |
| 5,428,663 A | 6/1995 | Grimes et al. | |
| 5,594,777 A | 1/1997 | Makkonen et al. | |
| 5,668,862 A | 9/1997 | Bannister et al. | |
| 5,787,355 A | 7/1998 | Bannister et al. | |
| 5,819,180 A * | 10/1998 | Alperovich et al. | 455/465 |
| 5,911,123 A | 6/1999 | Shaffer et al. | |
| 5,946,386 A | 8/1999 | Rogers et al. | |
| 6,111,942 A | 8/2000 | Kakizawa | |
| 6,192,237 B1 * | 2/2001 | Clapton et al. | 455/422.1 |
| 6,405,033 B1 | 6/2002 | Kennedy, III et al. | |
| 6,411,682 B1 * | 6/2002 | Fuller et al. | 379/67.1 |
| 6,430,289 B1 * | 8/2002 | Liffick | 370/352 |
| 6,640,097 B2 * | 10/2003 | Corrigan et al. | 455/414.1 |
| 6,771,953 B1 | 8/2004 | Chow et al. | |
| 7,133,503 B2 * | 11/2006 | Revisky et al. | 379/88.12 |
| 7,260,205 B1 * | 8/2007 | Murphy et al. | 379/215.01 |
| 7,280,821 B2 * | 10/2007 | Holt et al. | 455/414.1 |
| 7,289,816 B2 * | 10/2007 | Mills | 455/458 |
| 7,330,721 B2 * | 2/2008 | Bhatia et al. | 455/422.1 |
| 7,379,545 B2 * | 5/2008 | Torng et al. | 379/212.01 |
| 7,409,207 B2 * | 8/2008 | Wieczorek et al. | 455/418 |
| 7,676,221 B2 * | 3/2010 | Roundtree et al. | 455/414.1 |
| 7,920,551 B2 * | 4/2011 | Sylvain et al. | 370/352 |
| 2002/0146105 A1 | 10/2002 | McIntyre | |
| 2002/0194331 A1 * | 12/2002 | Lewis et al. | 709/224 |
| 2003/0123634 A1 * | 7/2003 | Chee | 379/220.01 |
| 2003/0148758 A1 * | 8/2003 | McMullin | 455/415 |
| 2003/0193990 A1 | 10/2003 | Vanderpool | |
| 2004/0148343 A1 | 7/2004 | Mottes | |
| 2004/0162058 A1 | 8/2004 | Mottes | |
| 2004/0176076 A1 * | 9/2004 | Uppuluri | 455/414.1 |
| 2008/0139180 A1 * | 6/2008 | Mills | 455/414.1 |
| 2008/0139184 A1 | 6/2008 | Mottes | |
| 2008/0139230 A1 | 6/2008 | Mottes | |
| 2009/0270082 A1 | 10/2009 | Mottes | |

FOREIGN PATENT DOCUMENTS

| | | |
|---|---|---|
| WO | 94/29992 | 12/1994 |
| WO | 99/31909 | 6/1999 |
| WO | 00/42809 | 7/2000 |
| WO | 2004/028124 | 4/2004 |

OTHER PUBLICATIONS

GSM 02.90 V8.0.0 (Mar. 1999) Technical Specification, Digital cellular telecommunications system (Phase 2+); Unstructured Supplementary Service Data (USSD)—Stage 1 (GSM 02.90 version 8.0.0. Release 1999).

European Search Report and Examination Report for European Application No. 05808272.8 dated Mar. 18, 2008.

* cited by examiner

UNSTRUCTURED SUPPLEMENTARY SERVICE DATA CALL CONTROL MANAGER WITHIN A WIRELESS NETWORK

This application is a continuation-in-part of U.S. patent application Ser. No. 11/791,176, filed May 21, 2007, now pending, which is the national stage of International application IL/05/01246, filed Nov. 23, 2005, which claims foreign priority to Israel application IL 165362, filed Nov. 24, 2004; and further claims the benefit of U.S. provisional patent application 60/890,546, filed 19 Feb. 2007, all of which is hereby incorporated by reference for all they contain.

TECHNICAL FIELD

The invention generally relates to wireless exchanges, and more specifically to wireless telephone exchanges using Unstructured Supplementary Service Data (USSD) as a data communication channel.

BACKGROUND OF THE INVENTION

Many telephone networks have a large number of telephones which are hardwired into the network and which have private access to the network from fixed locations. This requires providing access to the network by using dedicated circuits, such as business telephones through a PBX, and the like.

With the ever-growing demand for mobility, one problem associated with such type of operation is how to provide mobile persons with convenient and inexpensive access to telephone networks. These persons generally have a choice between locating a private-access business or home telephone, or a public-access payphone, which can be inconvenient, and using cellular telephone service, which provides a solution to the mobility problem but can be expensive.

Other problems, which may be associated with mobile persons who frequently access wireline telephone networks, exist such as the need for rerouting calls received at the addressee's fixed location while he/she is away from that location. Another typical problem that arises in certain organizations, is, calls that are made to communicate with a function in the organization rather than a specific person, i.e. a customer service person, marketing person, sales person etc. If a person originating the call dials the number given to them and the addressee is away, then either the caller will give up and call another organization or the caller may choose to leave a message. If the caller chooses to leave a message, there is no way of telling when this message will be heard and acted upon. One method of wireless contact between a plurality of user stations is described in U.S. Pat. No. 4,672,658. While the system shown therein may achieve the goal of operating a wireless PBX, it is subject to the drawback that it requires complex and relatively expensive user stations, and may not be smoothly integrated into a system for access to telephone networks.

U.S. Pat. No. 6,405,033 discloses a system for routing a call using a communications network, where the system includes mobile units, a network switching center, and service centers to provide a variety of traditional and enhanced services to the mobile units. When a user of a mobile unit issues a request for services to be provided from a service center, the network switching center receives the request and, in response, accesses a profile table to select an appropriate service center to establish a communication session with the mobile unit. The selected service center may then provide enhanced services to the mobile unit in order to satisfy the service request.

U.S. Pat. No. 6,771,953 describes provisioning of a wireless Centrex®-like service that offers the benefits of wireless voice and data services to subscribers having a need to move within a number of localities such as within a business campus. By the method described in this publication, a wireless telephone subscriber can use a standard cellular telephone as a wireless extension of his desktop phone, while being in the proximity of a miniature radio base station capable of communicating with the cellular telephone. Under these conditions, the subscriber can use the same cellular telephone that provides service in the public network, in the wireless Centrex environment.

US application publication 20030193990 discloses a system for accessing a telephone system, in which a set of user stations is matched with a set of base stations for connection to a telephone network. Each base station may be coupled directly or indirectly to the telephone network and is capable of initiating or receiving calls on the telephone network. Each user station may comprise a spread-spectrum transmitter or receiver and may be capable of dynamic connection to selected base stations. A number of base stations are coupled to a private exchange telephone system for coupling user stations to calls outside the telephone network. User stations may make and break connections with base stations as the user station moves between service regions, or is otherwise more advantageously serviced by other base stations. Base stations may be coupled to each other by means of a private exchange telephone system or other small business telephone system (such as a PBX, Centrex, or key-type system) so as to couple user stations to calls outside the telephone network.

Calls sent to wireless subscribers lack important information about the callers, calls and tasks related to a call. When a call is received by a subscriber, the subscriber usually needs to converse with the caller before the caller can be forwarded to another destination. During the call if information about the caller was displayed in the device, the display will be lost. Also calls forwarded to another party may lose the information about the caller in the new destination device. When conference calls are to be established, the called party may have information about the original caller only after a voice path is created. Inventive aspects disclosed herein will allow parties of incoming calls such as operators, secretaries, employees, conference call establishments, to obtain information about the caller, call, tasks related to call or other information before and during voice path establishment. Other inventive aspects will also automatically provide the status of device availability to another device.

Each of these patents and application is hereby incorporated by reference as if fully set forth herein.

SUMMARY OF THE INVENTION

According to a first embodiment a method for routing a request via a public cellular network to establish a communication session via a communication address associated with a private network, and for establishing the communication session, the method includes: establishing a pre-defined list of telephone numbers belonging to the private network; associating each of the telephone numbers with at least one communication address; defining at least one management rule for handling requests for establishing communication sessions with at least one of the communication addresses; receiving a request to establish a communication session, wherein at least one telephone number selected out of the pre-defined list of telephone numbers is associated with the request; routing the request towards a communication address associated with the at least one telephone number, and wherein the routing is carried out in accordance with the at least one management rule; and establishing a communication session between the originator of the arriving request for communication session and a user of the communication address, via at least one center of the public cellular network.

The term "communication address" as will be used in certain exemplary embodiments herein, is used to denote a member of the group consisting of: a wireline telephone number, a cellular telephone number, an e-mail address, a URI ("Uniform Resource Identifier"), a website address, and any combination thereof. Preferably, if a communication address is a cellular telephone number associated with a certain mobile station, at least one other communication address (e.g. another cellular telephone number) will also be associated with that mobile station, so that if a request is received to establish a call with either of the two cellular telephone numbers, it will be transferred to that single mobile station.

By yet another embodiment of the invention, substantially all telephone numbers included in the pre-defined list of telephone numbers, are cellular numbers.

According to yet another aspect of the invention there is provided a cellular network communication device operative to allow establishing of a communication session with a user of a communication address belonging to a private network. The cellular network communication device includes an apparatus for: establishing a pre-defined list of telephone numbers belonging to said private network; associating each of the telephone numbers with at least one communication address; defining at least one management rule for handling requests for establishing communication sessions directed to at least one of the communication addresses; receiving a request to establish a communication session that specifies at least one telephone number which belongs to the pre-defined list of telephone numbers; and establishing a communication session between the request's originator and a user associated with a communication address associated with the at least one telephone number. The communication session is established in accordance with that at least one management rule.

According to an embodiment of this aspect of the invention, the cellular network communication device further includes a user buffer operative to store at least one prioritized communication address associated with the user's telephone number, an apparatus operative to prevent, in response to a user's request to prevent incoming communication sessions, establishing communication sessions with that user through any of the communication addresses associated with the user's telephone number, and a controller operative to determine if a request for communication session arrives to that at least one prioritized communication address, and if in the affirmative, override the apparatus operative to prevent the establishing the communication sessions, and allow establishing that communication session.

By yet another embodiment of the invention, the cellular network communication device further includes an apparatus for providing an indication at the communication address relating to the telephone number specified in the request, before such a communication session is routed towards the at least one center of said public cellular network.

According to still another embodiment of the invention, the cellular network communication device further includes an apparatus for associating a message with the communication session being established for display at the communication address, where such message can be a USSD type of message, or a real time data message transmitted via a data communication channel and the like. Preferably, the message includes the number called and/or identification of the address of the device initiating the communication session.

By yet another embodiment of the invention, the cellular network communication device further includes an apparatus for initiating a transmittal of audio signals and/or video signals while the communication session with the mobile station is being established or being kept on hold. Preferably, the audio signals and/or video signals are selected in response to identifying the type of the device initiating the call.

According to another embodiment of the invention, the cellular network communication device is adapted to receive at least one member of the group consisting of: data signals, voice signal, facsimile signals, video signals and any combination thereof.

DETAILED DESCRIPTION OF THE INVENTION

Figure 1:
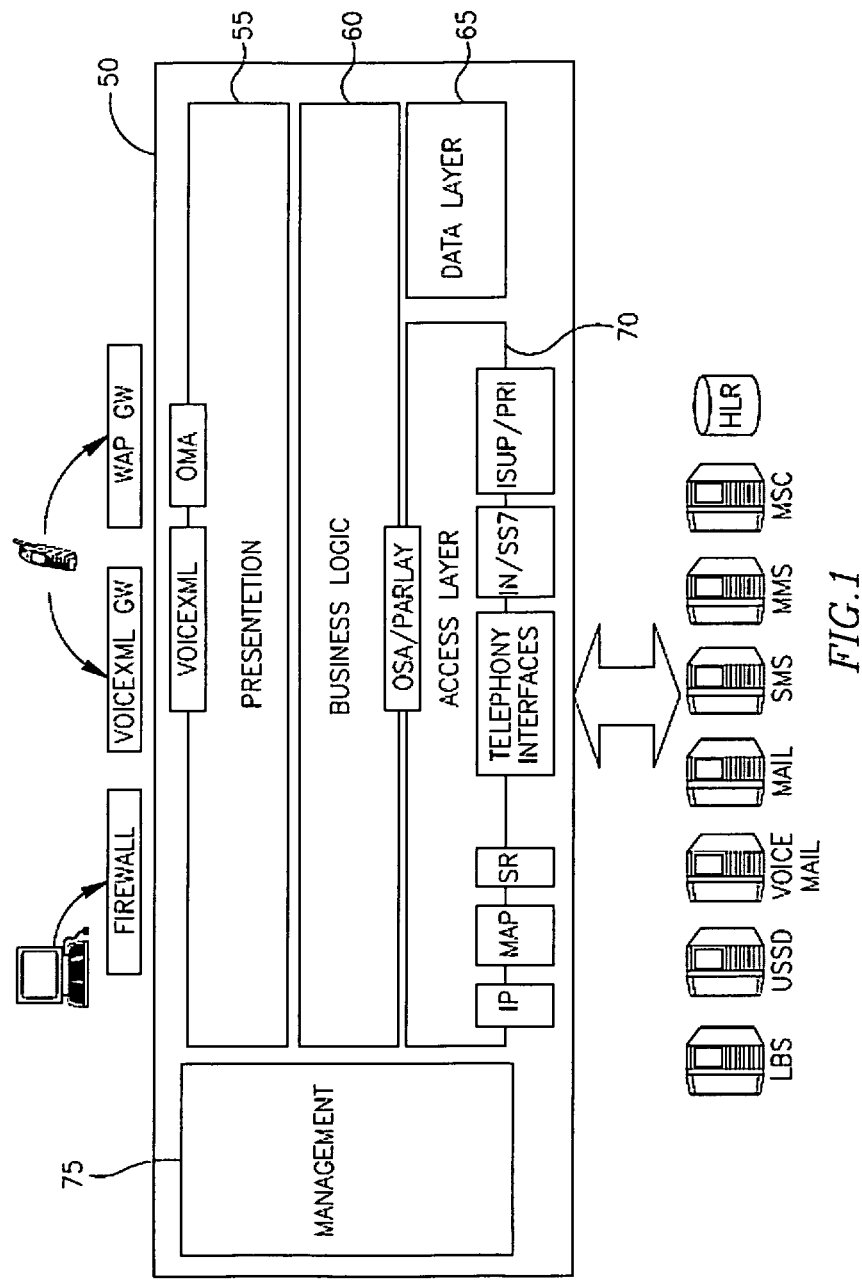
FIG. 1 is a schematic illustration of a device constructed according to a preferred embodiment of the invention.

This disclosure describes the best mode or modes of practicing the invention as presently contemplated. It is important to note that these embodiments are only examples to advise one of ordinary skill in the art of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the various views of the drawings, like reference characters designate like or similar parts.

Certain embodiments disclosed herein enable wireless operators to provide their customers with a hosted PBX-like solution, in which PBX-like extensions are in fact wireless devices (e.g. even their current wireless devices). Customers may order any amount of extensions they require, so that they instantly expand their private network to include the additional extensions required (wireless devices). Thus, certain embodiments disclosed herein provide customers with a flexible solution, simple and easy to use enterprise web management interface, and a fully distributed mobile extension.

In accordance with one embodiment of the disclosed invention, mobile stations and network devices exchange messages for call control and information exchange using messages in accordance with the Unstructured Supplementary Service Data (USSD) protocol. Typically, the Call Control Manager may send a specific call control request over the network as a USSD request to another device, which returns a response as a USSD response. For example, this response may contain a list of possible call control selections, options or actions that the device may take. The response may be resent by the responding device. Devices may also receive information via USSD notifications from other devices on the network.

By one embodiment of the invention, all the telephone numbers associated with the private network (the enterprise telephone numbers) are cellular numbers which are typically handled and managed by the public cellular network as a private network. However, by another embodiment of the invention, one or more of the enterprise numbers are wireline numbers which are automatically forwarded to their pre-defined corresponding cellular numbers, so that the caller calls a wireline telephone number and his call is first diverted to the cellular network, and then processed in accordance with the principles of the invention as disclosed herein.

According to an embodiment of the invention, a method includes providing an indication to the mobile station which allows the user of that mobile station to identify the telephone number to which the call was addressed, before re-routing the call. This embodiment is particularly useful when more than one telephone number is associated with a single mobile station enabling the user to identify the number to which the call was destined, e.g. if the user of the mobile station belongs to a group of say, sales people or support people, or belongs to a secondary group (for example, when the person receives a call that had not been answered by another mobile station that was supposed to receive that arriving call). Another example is when a person also uses their own mobile telephone as the mobile station, so that the indication will provide the possibility to differentiate between calls that were made to their work number (i.e. those that were re-routed) and private calls made to their private mobile telephone.

In addition or in the alternative, for at least one of the telephone numbers included in the pre-defined list, there is more than one corresponding address included in the public cellular network addresses' list, so that a call can be transferred in accordance with a pre-defined routing scheme to more than one address. Accordingly various Direct Inward Dialing ("DID") and groups are managed within the private network and based on the logic rings of the telephone, the called number is sent to the user via USSD (or via a real time data message transmitted via a data communication channel, or via SMS (short message service) generated from the HLR (home location register) when no USSD exists, or any other methods known in the art per se). Once the user views the message, they may see the regular calling message together with the caller's ANI, e.g. by pressing any or a certain key of the mobile station. When the end-user places a call, it will have a default ANI. However, he will be able to select a different ANI, based on the DID/called numbers that the end-user may receive. One way of carrying out this embodiment is by selecting the option of trigger on originate, where all IN signaling is routed to the WX node, which analyzes the number, and based on information associated with the number (for example, included in its respective tables), will initiate dialing the default number. In addition or in the alternative, if the caller dialed a pre-defined sign or certain code, it will be interpreted as a request to dial the call as if it has been dialed from another line (e.g. a personal line). The WX node will replace the default ANI with the other line's ANI (or any other ANI associated with the other line), and will update the caller's number in the MSC CDR table for billing purposes (replacing the default number with the new originator).

The term Automatic Number Identification (ANI) as will be used herein should be understood to encompass all means and methods known in the art for the identification of the caller, as the case may be, such as ANI, callerID, MSISDN, etc. Alternatively, an Unstructured Supplementary Service Data ("USSD") message or DTMF string will indicate to the communication device of the invention, to which ANI should that call be associated with.

By yet another embodiment of the invention, for an arriving call a routing scheme is provided to one of a plurality of addresses out of the list of public cellular network addresses that correspond to one telephone number, and the scheme provides for the selection of a number in accordance with at least one criterion selected from a group consisting of: time of the day, day of the week and national holidays.

In accordance with still another embodiment of the invention, the method includes preventing the re-routing step in response to a request initiated by the mobile station's user. Preferably, this preventing step further includes pre-defining a priority list comprising at least one telephone number, so that when a call arrives from other numbers which are not included in this priority list, it will not be routed to that mobile station.

By yet another embodiment, the method provided further comprises a step of associating a message with the call being rerouted for display at said mobile station. Preferably, the message is transmitted to the mobile station by using USSD.

The message may comprise identification of the address of the device initiating the call, such as the automatic number identification ("ANI") of the device initiating the call In another exemplary USSD message, a subscriber receives a USSD message with the call control status (i.e., in-call, idle, etc.) of another subscriber call control status. This data is sent independently, or as part of any of the relevant call control interaction messages i.e. if a subscriber is in-call and current USSD message is the in-call message, the WX will send a new in-call USSD message which will include the state change of the other subscriber and the in-call call control interactions options (can be same interactions or new list of options). The other subscriber call control updates can be received at all times or can be restricted to certain times, such as time of the day, state of in-call subscriber.

In another exemplary USSD message, a subscriber receives a USSD message with details of all calls waiting in a queue (the subscriber's own or any other subscriber queue). Each time there is a change in the queue a new USSD message is sent to the subscriber. A subscriber receives the above message only if a defined threshold of a number of calls in the queue has been reached.

In another exemplary USSD message, a subscriber receives a USSD message with a list of numbers or names of employees. The subscriber then selects from the list a destination target, in which the subscriber can "barge in" to the call or silently monitor the selected destination.

In another exemplary USSD message, a subscriber receives a USSD message with the name of the caller and/or their title in the company, for example, "Joe Cohen, VP Marketing Acme Ltd. is calling." The name of the caller can be stored in a WX database or any integrated database.

In addition or in the alternative, the method includes diverting a call received at the mobile terminal to another station associated with the private network, which can be another mobile terminal, a PC, a wireline telephone, etc.

Preferably, this diversion of the call is made in response to a request initiated by the mobile station user, e.g. by using a pre-defined key associated with that mobile station. Still preferably, a message may be associated with the diverted call, and may be generated in response to a pre-define code sent from the mobile station. The message may be either a visual message (such as USSD message, etc.), a voice message, or some other alerting method, depending on the type of device to which the call has been diverted. Thus, while the end user gets an indication of the arriving call (e.g. ringing) he/she can select to divert the call to a third party (e.g. a secretary), and select a notification, which will be presented at the secretary's station (e.g. "please take a message," "I am busy, will call them later," "get rid of them," etc.)

Local option—The transfer can be requested by the mobile station and executed by a switch associated with the private network. In which case, notifications will be stored locally, but there will be a need to synchronize them with the cellular network operation.

Network option—the mobile station sends a message to the communication device of the invention (the wireless Centrex) and that device takes control of the transfer request, manages the process, while instructions such as re-routing schemes etc., are stored at the network's center and are assigned by the wireless Centrex, e.g. to the transfer destination.

The message would be sent to the receiving client via USSD. The data sent in such a message is typically data regarding the call information such as ANI, DNIS (called number by number, but can be by done by name, too, if the system of the invention can match it with its own database), in order to enable the receiving phone to generate the right message.

Optionally, the receiving party may view the message and then select from a list of several options, the preferred way of handling the call (e.g. divert the call to a secretary, send to voice mailbox, transfer to someone else such as the boss, etc.)

Another option is to send a voice prompt as the message, which will be played to the receiving party (canned voice message, such as "please set a meeting with caller," "take care of this" etc.). The receiver may then request to listen again to the message, answer the caller, etc. In this case there is a need for an IVR or Intelligent Peripheral infrastructure to allow playing the messages.

By still another embodiment of the invention, the private network comprises a WLAN network. If in such a case the incoming call is a voice call, then the method includes selecting a path of rerouting the call to the mobile station either along the WLAN network or along the public cellular network, in accordance with at least pre-defined criterion, such as the quality of the call being rerouted. Consequently, the wireless Centrex users will be able to leverage the WLAN infrastructure of their company and when the user is in another location, the voice call can be routed via the WLAN (Voice over WLAN-VoWLAN), this may enable companies to have better local reception and enable the wireless operator to use their mobile network more efficiently, which in return allows leveraging the data network while saving money on expansion of the base stations). In addition, by this embodiment the mobile operator may have one billing plan for "local" calls originated from home WLAN, and a different billing plan for calls initiated from out of the home LAN.

Typically, the voice call is automatically connected to a WLAN and routed along that network. When the local signal is better or there is any other pre-defined rule governing such a scenario, e.g., all local calls will be routed over WLAN whenever in range or VoWLAN enabled only on their own company premise (because in other locations the quality of the infrastructure is unknown), use VoWLAN if external voice quality is less than a pre-defined threshold, etc.)

In accordance with another embodiment of the invention, the method provided allows merging of IP Telephony features, WLAN capabilities, and/or Wi-Max capabilities under the cellular flow architecture umbrella, in a way that the IP based subscribers may be provided with any of the WX cellular services and features. The WX will allow merging between the IP world and the features associated therewith and the cellular network and WX features, preferably in a way that ensures that the IP WX subscriber will be provided with the same capabilities as a regular cellular subscriber.

In accordance with another embodiment of the invention, the method further includes a pre-defined auto reply to a calling party in response to a call received at the mobile station. Such a pre-defined auto reply can be an e-mail, an SMS, a voice message, and the like. Therefore, the end user may define his line to send such an auto reply to the calling party, providing the latter by using TTS or wav type of file with any details desired such as "I am out of my office," "will return on _____," "will have limited access to my voice mailbox," etc. Preferably, the type of the pre-defined auto reply is selected based on the type of the device originating the incoming call (e.g. wireless and wireline). For a wireless party originating the call, the message can be in a form of SMS, while for a wireline the message may be in the form of an e-mail or a voice announcement.

In addition, the method of the present invention may further include transmitting from the public cellular network center, audio signals and/or video signals while the call with the mobile station is being established or the call is being kept on hold. Preferably, the audio signals and/or video signals are selected in response to identifying the type of the device initiating the call. In addition, these audio or video signals may be selected from among a plurality of audio or video clips, where the selection is based on one or more selection criteria such as the number called, caller ANI, time of the day, group number called, physical location of called subscriber, presence of called subscriber, International Mobile Equipment Identity ("IMEI"), and the like.

Furthermore, it is possible for the company's administrator to associate the whole company with the same music/video that will be played whenever a call is in queue or on hold, depending of course on the caller's device. If no indication is provided as to the capabilities supported by the caller's device, some default audio clips, such as music, branded messages, or announcements etc. may be played.

By this embodiment, video sessions may be established with the callers (provided of course the system identifies them as having the equipment required for establishing such a session), enable a company to promote its own business by sending pictures/video to the callers for them to view (e.g., marketing data, video of a product).

According to still another embodiment of the invention, if a request for establishing a communication session has not been answered within a pre-defined period of time by a user associated with the telephone number specified in that request, the request will be re-routed towards a new communication address (e.g. voice mail address, web site, another telephone number, etc.) in accordance with a pre-defined management rule.

In accordance with yet another embodiment of the invention, the method includes a step of forwarding a call to an answering service associated with the public cellular network center and having the message that will be left thereat by the caller, if not in office (or in case of overflow). The message will be forwarded to the mobile station, either automatically, or in response to the mobile station request to pull the messages received. Preferably, the mobile station is selected by the answering service center from among a plurality of mobile stations in accordance with a list of addresses provided to the provider of that answering service.

According to yet another embodiment, a replacing station may be provided which is operative to receive arriving calls instead of the mobile station to which the call was destined. Such replacement may be in response to a request sent by the mobile station to the public cellular network center. Preferably, the replacing station is selected from a routing list stored at the public cellular network center.

This embodiment enables the user to change to various pre-defined presence scenarios. The presence scenarios and routing instruction are stored in the cellular network center, and preferably each presence scenario will be associated with suitable operative instructions, for example: "in meeting" scenario will be translated by the network so that all arriving calls should be forwarded to the secretary's station. Once the mobile station user changes the scenario, a message is sent to wireless Centrex, which will handle incoming calls based on the predefined routing rules.

According to yet another embodiment, selected subscribers may get an indication as to the whereabouts of other group members, e.g. a secretary may get an indication as whether the boss is present, support manager can view all support employees presence, while support employees will be prevented from viewing each other or their boss' presence.

In accordance with still another embodiment of the invention, incoming calls to a WX subscriber can be routed based on the subscriber's location, e.g. create different routing tables while the subscriber is in the office, at home or out of office, where the routing may be effected automatically, based on the location of the subscriber.

By yet another embodiment of the invention, the method provided further includes providing the mobile station with a voice prompt indicating that an arriving call is being transferred.

In addition or in the alternative, the enterprise management administrator may configure and define routing rules for all the company's employees. For example, the administrator may enable selected people to control and define selected groups, e.g. a secretary may thus define their boss's call routing scheme, a sales manager can control the respective sales group, etc. Furthermore, the administrator may be provided with the ability to carry out selected functionalities such as, add, delete freeze employee line, define groups, configure routing schemes per line (line can be a group, company main line, or employee's direct line), configure a conference call for another hour, etc.

By still another aspect of the present invention, a cellular telephone device includes a Bluetooth® unit adapted to allow communication between the cellular telephone and a computer device located nearby, so that when a call arrives at the cellular telephone device it will be automatically (or upon pressing a pre-defined key whether prior to the arrival of the call, or after the cellular telephone has started to ring) sending call control data to that computer device, allowing the handling of the call through the use of the computer device, e.g. a soft phone.

In accordance with yet another embodiment, a transfer message is sent from the cellular network center to trigger an arriving call being placed on hold.

Turning to FIG. 1, which presents a schematic diagram of a Call Control Manager, based on a wireless Centrex device ("WX") example platform 50 constructed in accordance with the principles of the present invention. The WX platform demonstrated includes the following main layers:

a. Presentation layer 55, which comprises management interfaces such as mobile operator administrator, enterprise administrator, and End users, and allows access to them via PC, wireless devices, etc.
b. Application/business Logic layer 60—comprises the business logic of the application, including features such as call routing, multi device ringing, transfer, conference, voice auto attendant, etc. This layer provides an application programming interface for the Presentation layer 55, and for integration with other enterprise business systems, such as email, calendar applications and web services.
c. Data layer 65—comprises data server, database, data backup, storage, etc.
d. Access layer 70—the layer connects to the network infrastructure handling signaling, call control server, telephony and IP interfaces and gateways. Examples for the functionalities that may be included in this layer are: IP, Mobile Application Protocol (MAP), Speech Recognition (SR), Integrated Services digital network User Part (ISUP); Primary Rate Interface (PRI}, etc.
e. Management layer 75—the layer which include OMAP layer (e.g. OSS, BSS, monitoring, alerts, SNMP, provisioning, etc.)

Figure 2:
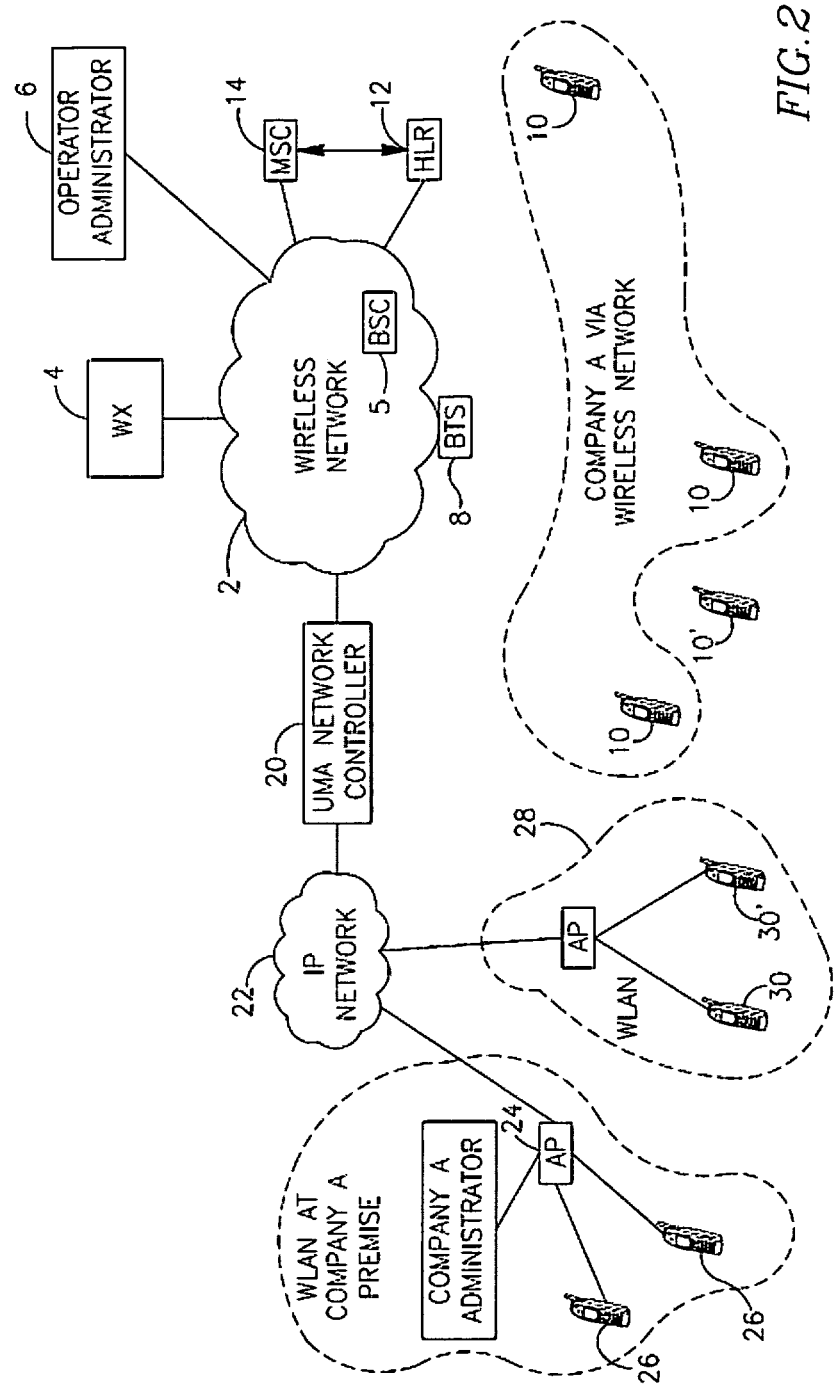
FIG. 2 is a schematic view of a system configured in accordance with a preferred embodiment of the invention.

Turning to FIG. 2, which illustrates a wireless network 2 operative in accordance with certain embodiments of the present invention. The network comprises, as normally all wireless networks do, base station controller ("BSC") 5, mobile switching center ("MSC") 14, HLR 12, BTS 8 and the operator's management system 6, as well as a plurality of mobile stations. The mobile stations include, but are not limited to, cellular phones such as cellular phones 10 and 10', personal digital assistants, smart phones, and wireless network devices such as 30. In addition, the network described herein further includes a Call Control Manager, wireless Centrex device ("WX") 4 constructed in accordance one or more of the embodiments of the present invention.

For the sake of this example, we assume that all cellular phones designated in this FIG. 2 with numeral 10, belong to users that are associated with company A which is a subscriber of the WX service, while cellular telephone 10' belongs to a user that does not belong to company A organization.

The wireless network 2 according to this FIG. 2 is in communication with IP network 22 through UMA network controller 20. IP network 22 is associated with a number of access points ("AP") 24, wherein each of these access points acts as a gateway connecting a corresponding wireless local area network (WLAN) with the IP network 22. As will be appreciated by those skilled in the art, will understand that other arrangements may be used e.g. a PSTN network instead of the IP network (with corresponding COs instead of the APs, etc.).

Considering a first case where subscriber 10', which is not part of organization A, calls company A sales group number. The request to establish this call reaches wireless network 2, is processed and the address associated with that request is identified as one that belongs to a wireless Centrex service. Following this identification, the request is routed to wireless Centrex 4 for further handling. At wireless Centrex 4 there is a pre-defined list of telephone numbers the wireless Centrex identifies this as a call for company A and then identifies by applying the list of telephone numbers of sales persons associated with that sales group number, subscribers 10 and 30. Wireless Centrex 4 receives the input of the number requested, and determines that the call should be established with either one of subscribers 10 and 30. The WX communicates with HLR and/or MSC 14 which will determine through which of the BTSs associated with wireless network 2, should this call be routed. BTS 8 is selected based on the presence of subscriber 10, while subscriber 30 will be reached via UMA network controller 20, through IP network 22 and AP 24. All four subscribers shown in this example, receive the request to establish a call (e.g. telephone ringing), and once the first of this group accepts the call, the other three mobile station will stop ringing.

In another example where a request for establishing a call with company A's subscriber 10, is initiated by a caller 30 from WLAN 28. The request is processed through IP network 22 and conveyed to wireless network 2. The request is processed and the address associated with that request is identified as one that belongs to company A. Following this identification, the request is routed to wireless Centrex 4 for further handling. Assuming for the sake of this example, that the request was placed for the number associated with the sales department. At wireless Centrex 4 there is a pre-defined list of telephone numbers of sales persons associated with the sales department number, preferably arranged by priorities. Wireless Centrex 4 receives the input of the number requested, and determines that the call should be established with the first number of the list associated with the number dialed. The WX communicates with HLR and/or MSC 14 which will determine through which of the BTS's associated with wireless network 2, should this call be routed, wherein BTS 8 is selected based on the presence of subscriber 10, to whom the call is now being routed, in a cell covered by BTS 8. The subscriber receives the request to establish a call, they will preferably also receive prior to establishing the call an indication of the original number that was dialed by subscriber 30' of WLAN 28 with or without an indication of the WLAN subscriber's identity, and thereafter subscriber 10 accepts the call.

Figure 3:
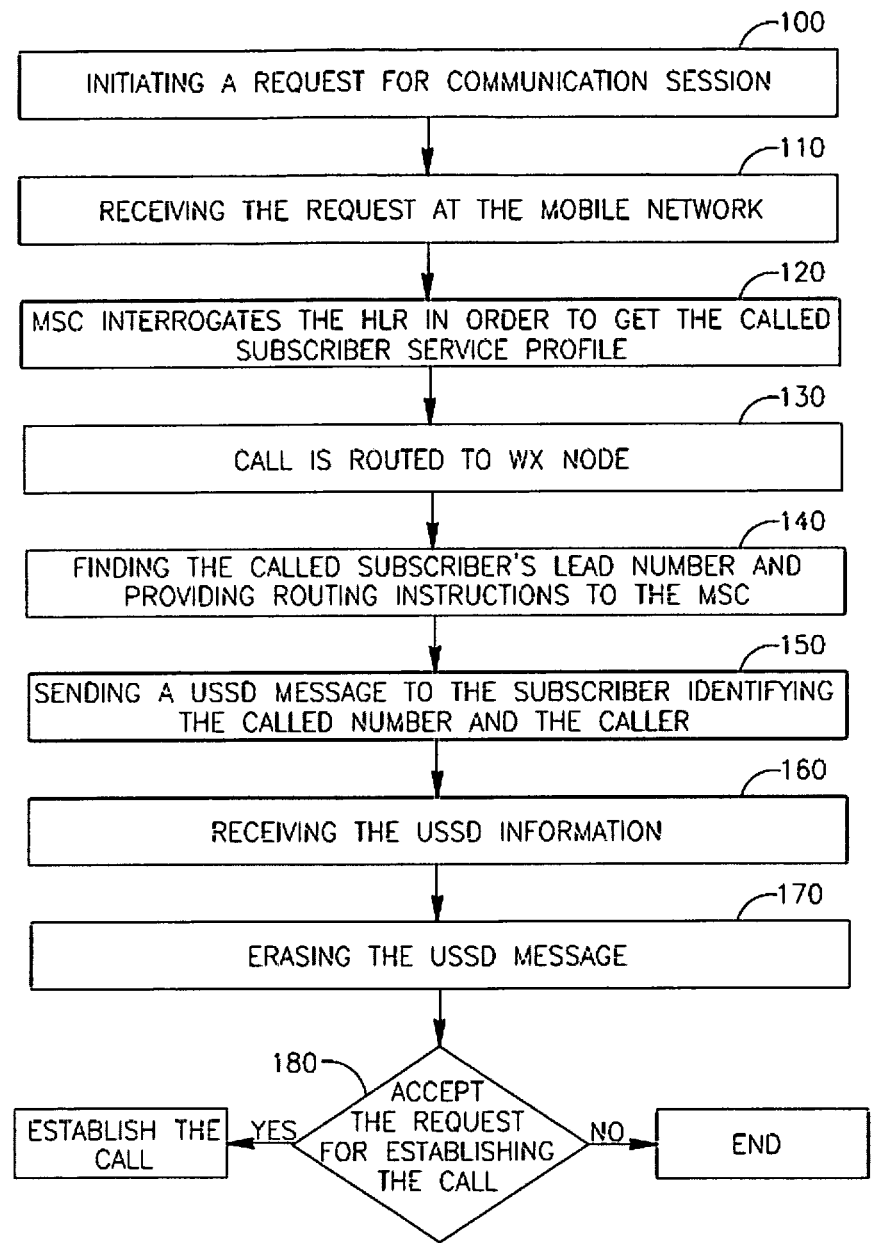
FIG. 3 is a block diagram illustrating the implementation of a method in accordance with an embodiment of the invention.

FIG. 3 illustrates a flow chart demonstrating an example of implementing the solution provided by the principles of the present invention. This example concerns an inbound voice call addressed to a mobile user, in which a cellular network communication device, the wireless Centrex also operates as an IN signaling node.

By this example, a request is initiated to establish a communication session, e.g. a telephone call, with a certain subscriber of a mobile network that is also a subscriber of the wireless Centrex system (step 100). The request may either be initiated by a user belonging to that mobile network, or from any external network (i.e. PSTN). Similarly, the request may be in the form of an e-mail sent to the user's e-mail address, for presenting it on their mobile device.

The request enters the mobile network (step 110) via a Gateway Mobile Switching Center (GMSC), for example: a call from the PSTN with a mobile dialed number will be routed to the GMSC, and received at a MSC/GMSC of the mobile network.

The MSC/GMSC then interrogates the HLR (step 120), in order to get the called subscriber service profile. According to the HLR's Terminate IN Key, the IN signaling of the call is routed toward a wireless Centrex node ("WX") of the present invention. Alternatively, the IN signaling of the call will be routed toward the WX according to the dialed number (e.g. all numbers between "1001" and "1100" should be routed to the WX) (step 130).

The wireless Centrex then receives details about the call initiator (i.e. ANI, called number, if the subscriber is attached to the network or the last VLR update).

The subscriber of this example has several lines associated with his one device (different addresses), all of which are managed by the WX node. The subscriber has one lead (e.g. default) number and a list of additional numbers (addresses) is associated at the WX node with that subscriber. When a call is received on any of the subscriber's lines, the following process is initiated.

At the WX, the number dialed is matched against the pre-defined list, and the appropriate lead number for the subscriber is determined, and based on the information available, e.g. the lead number, routing tables, rules and other information, returns to the MSC with routing instructions for that call (step 140). In some cases, in which the mobile network has limited IN capabilities, or additional resources are needed, the WX may request to route the call to the WX Service Node, which will physically control and route the call.

A USSD message is then sent to the subscriber's lead number at his mobile device preferably with information regarding the called number and ANI of the caller (step 150).

The subscriber receives the information embedded in the USSD message while his telephone is ringing (step 160).

The subscriber presses any key and USSD message may be erased (step 170). The Subscriber views the regular incoming call screen, and can accept or reject the call (step 180)

As an alternative, the subscriber may receive in step 160 the USSD message before the telephone is ringing. Then the subscriber may select an action from a known list. The USSD will transfer the selection to WX node, which will route the call based on subscriber selection and other parameters that are stored at the management of the WX. The MSC will route the call based on the instructions it received from the WX, while the latter will continue to manage the call and receive updates regarding the call status (e.g. once the call is disconnected the MSC will send the information to the WX via signaling) (step 150). Based on the call information, the WX routing tables and rules and other parameters, the WX will decide if and when to make changes in respect of this call.

Figure 4:
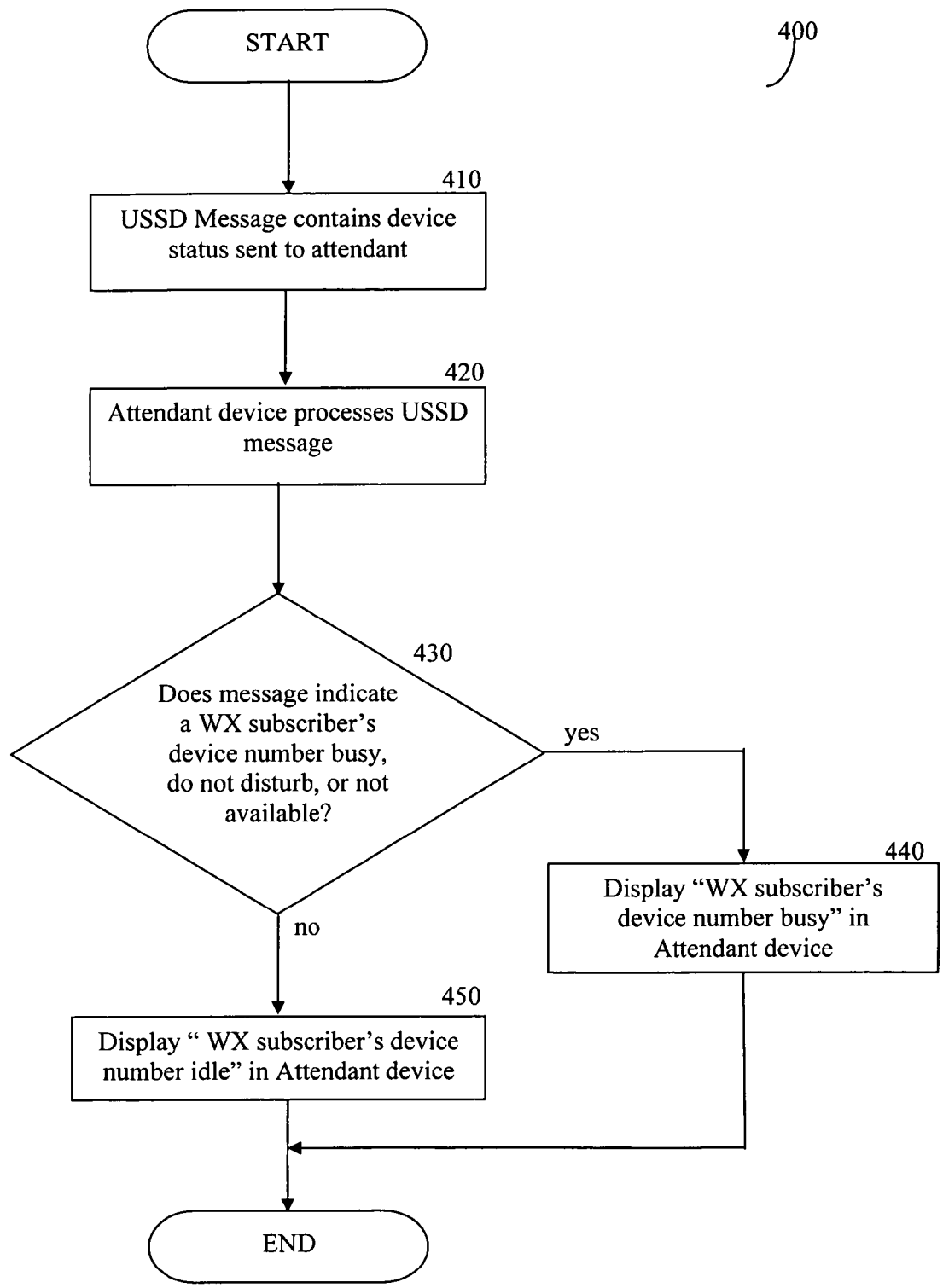
FIG. 4 is a block diagram illustrating the implementation of a method of Device status information by using a USSD interface.

FIG. 4 Illustrate a device status indication using the USSD protocol. In this exemplary message flow, an attendant embodied in a device 10, receives a status of another device 10 within a group visible to or associated with the attendant. A device whose status is checked, may be, but is not limited to, the attendant's supervisor cellular phone 10. The USSD message informs, for example, to the attendant device 10 the type of availability of the supervisor device 10 to receive calls, messages, and the likes on the respective device. The attendant device may display a physical indication, e.g., a light indication, a virtual indication, or a text indicating the supervisor's device status. The attendant can request at any time the status of the supervisor device 10. A person skilled-in-the-art would readily realize that other forms of communication can be transferred in the same manner. For example, providing a busy signal to an attendant's device 10 when the supervisor's device 10 is in use. It should be further noted that the notation of a supervisor's device 10 is provided for reference purposes only and any one of the devices 10 may be correlated to the attendant's device 10 to provide the benefits of the disclosed invention.

In addition to status information, data information and control information can also be communicated between devices. Data information can be USSD messages sent from a device to a group of devices with information such as meeting information, routing location maps and so on. Control information can be USSD messages to a device instructing the device on how to present data sent to the device such as text layout, volume from the sending device and so on.

Specifically, FIG. 4 shows an information message sent by the WX node 4 to the attendant device 10 (step 410). The USSD message is generated, either automatically or manually, each time the availability of the supervisor device 10 changes. A status change in supervisor device 10 may occur when a call is disconnected, a call originates, out of range, "do not disturb" mode, and the likes. A status change may also occur automatically based on time of day, day of the week, day of the year, predefined holidays, and others. The USSD message can include additional options consisting of, but not limited to, options such as call control interaction, calling number and so on. The information message is received at the attendant device 10 (step 420) and the status from the message is displayed on or by the attendant's device 10. If the USSD message indicates that the supervisor device 10 is busy (step 430) calls, messages, or other communications, are not transferred to the respective device (step 440) from the attendant device 10; otherwise, calls, messages, or other communications, are transferred to the supervisor device 10 (step 450) from the attendant device 10. A partial blocks of calls, messages, or other communication can be requested. A partial block will block all requests to supervisor except for a few requests allowed to be transferred by the attendant. Those allowed are on a list displayed on the attendant screen. A virtual or physical indication, or a text at the attendant device 10, can be displayed indicating the supervisor's device 10 status. During this exemplary message flow, the supervisor's device status may change while the attendant responding to a call. New USSD message is re-sent to the attendant while the attendant is in-call, notifying the attendant of the modified state, this USSD message can include additional options consisting of, but not limited to, options such as call control interaction options of the attendant current state, calling number and so on.

Figure 5:
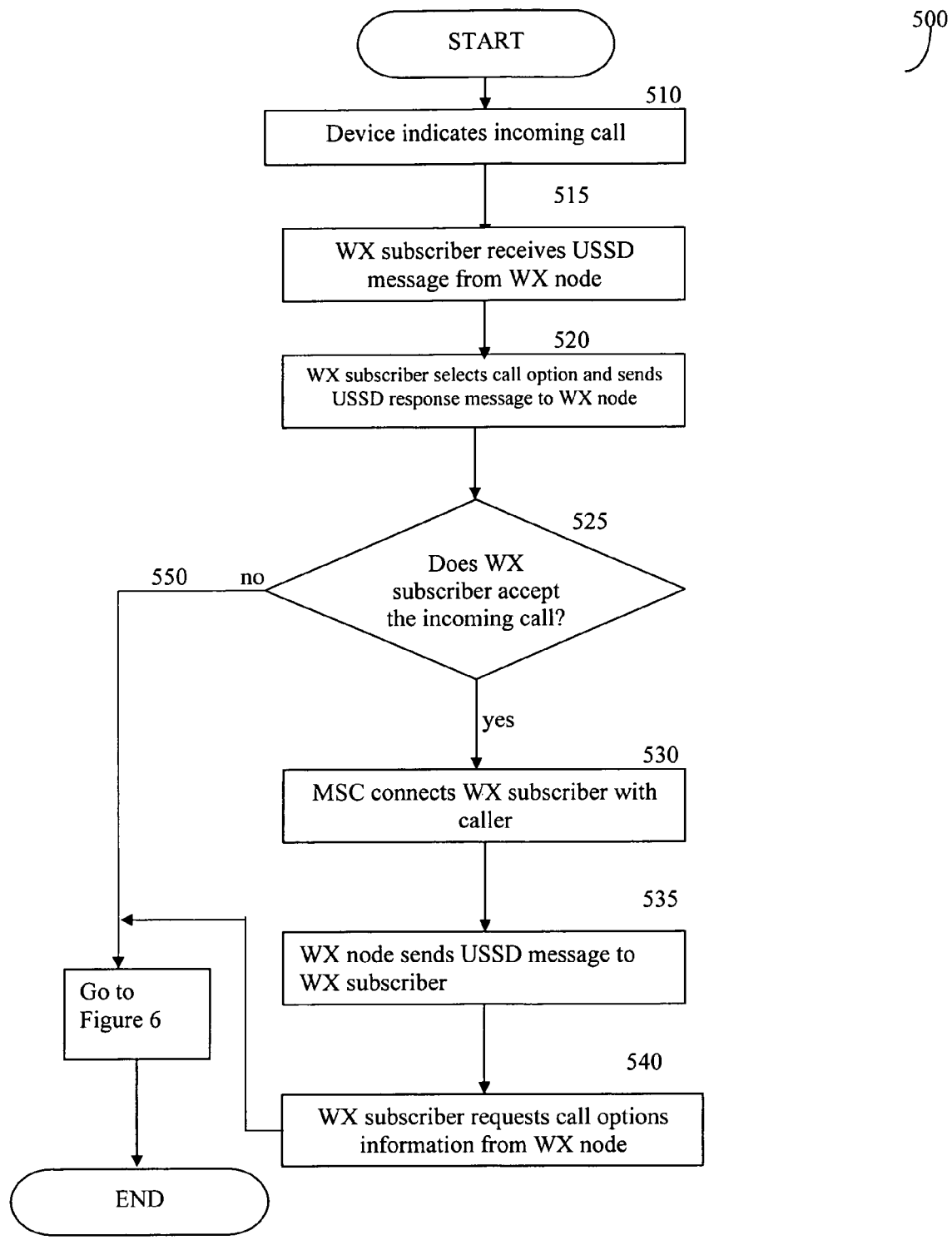
FIG. 5 is a block diagram illustrating the implementation of a method of USSD call origination.

FIG. 5 illustrates the processing of an incoming call with information provided on the WX subscriber device 10 about the originating caller, called number, and information about the WX subscriber's call handling options and selections.

A caller originates a call to a WX subscriber 10. The mobile operator's MSC 14 receives the call, and because the destination is a WX subscriber 10, the MSC 14 passes the call details to WX node 4. The WX node 4 receives the information regarding the new call and looks up the data related to the called number and identifies the WX subscriber 10.

The WX node 4 then alert the WX subscriber 10 with an incoming call message (step 510). WX node 4 sends a USSD message 515 to WX subscriber 10 with the call control options of the ringing state. The options can be the same to all WX subscribers 10 or can be customized per WX subscriber 10, the options may be further different if WX subscriber 10 is idle and a new call is ringing or in a similar case were the subscriber 10 is in call and receives a new call (call waiting). The WX subscriber 10 has the option of changing the exact USSD message received at each state of the call such as the listed options of the message. The WX subscriber 10 can define, for example via a web interface, if and how to receive call control messages while the ring-tone is received. In one embodiment of the disclosed invention the WX subscriber 10 will have to manually accept the USSD session and then receive the USSD message, however, embodiments that automatically accept the USSD sessions are specifically included in the scope of the disclosed invention.

Call control manager sends the USSD messages to the WX subscriber 10 and interacts with the WX node 4. WX node 4 interacts with the call control manager providing the call control manager with the information of which WX subscriber 10 to set up the USSD session with, and what USSD message to send to the WX subscriber 10. Call control manager also receives information from WX subscriber 10 such as: WX subscriber 10 from session ID "x" sent an answer. The USSD forwards the message to the WX node 4. The WX node 4 maintains call control parameters such as timers and messages associated with USSD interface protocol and WX subscriber 10. It should be noted that the WX subscriber 10 can request information from WX node 4 during any state of the call by initiating USSD messages in accordance with the principles of the disclosed invention.

Once the request to the WX node 4 is sent, the WX subscriber 10 can wait for the WX node 4 to provide the caller information and response options before proceeding with the call (step 515).

Once the USSD message is received by the WX subscriber 10 (step 515), the WX subscriber 10 (step 520) sends a USSD message back to the WX node 4 indicating to the WX node 4 that the WX subscriber 10 either accepts or rejects the call with routing response data. Rejecting or accepting a call by the subscriber 10, can in some cases requires the WX subscriber 10 to select the "send" button or "end" button on the device 10. In many cases these options are managed directly by the MSC without USSD message sent by the WX subscriber 10 to the WX node 4. The WX subscriber 10 can also send messages to the WX node 4 by sending a predefined string of digits to the WX node 4. The string of digits may be created by, but is not limited to, a depression of a physical button or a button displayed on a touch screen. The buttons may be depressed in sequence or in parallel. In other embodiments of the disclosed invention voice activation or motion detection activation may be used and are integral part of the disclosed invention.

If the WX subscriber 10 accepts the call 525, the WX node 4 sends a message to the MSC 14 to connect the incoming call with the WX subscriber 10. The MSC 14 connects the call (step 530). The WX node 4 also sends USSD message (step 535) to the WX subscriber 10 providing updated call control options for the state of the connected call. During the call the WX subscriber 10 may lose the current response options display on his device. When a device 10 indicates that it wants the current state interaction information, WX node 4 receives request (step 540) from WX subscriber 10 and sends a USSD message providing caller information with the current response options, which will be displayed on the device 10.

The WX subscriber 10 sends a USSD message to further provide options on how to handle the call. In a non-limiting example these may be, but not limited to, a request to transfer the call to attendant, or transfer the call with a canned message to instruct the party how to handle the call. Such instructions may include, but are not limited to, setting a meeting with the caller, providing help to the caller, taking a message from the caller, overriding a disallow incoming calls from a particular caller, or establishing a conference call with another WX subscriber 10, with or without canned messages, and so on.

Once the WX subscriber 10 is in the process of a call and receives the USSD updated call control options message, the WX subscriber 10 can select, for example, the routing option displayed on the screen, or just converse with the caller (step 550). The WX node 4 proceeds with the call in accordance with the principles disclosed with respect of FIG. 6. If the WX subscriber 10 rejects the call (step 550), the WX subscriber can either ignore the call or forward the call (step 550). As described above the WX subscriber 10 sends USSD message to further provide options on how to handle the rejected call.

Figure 6:
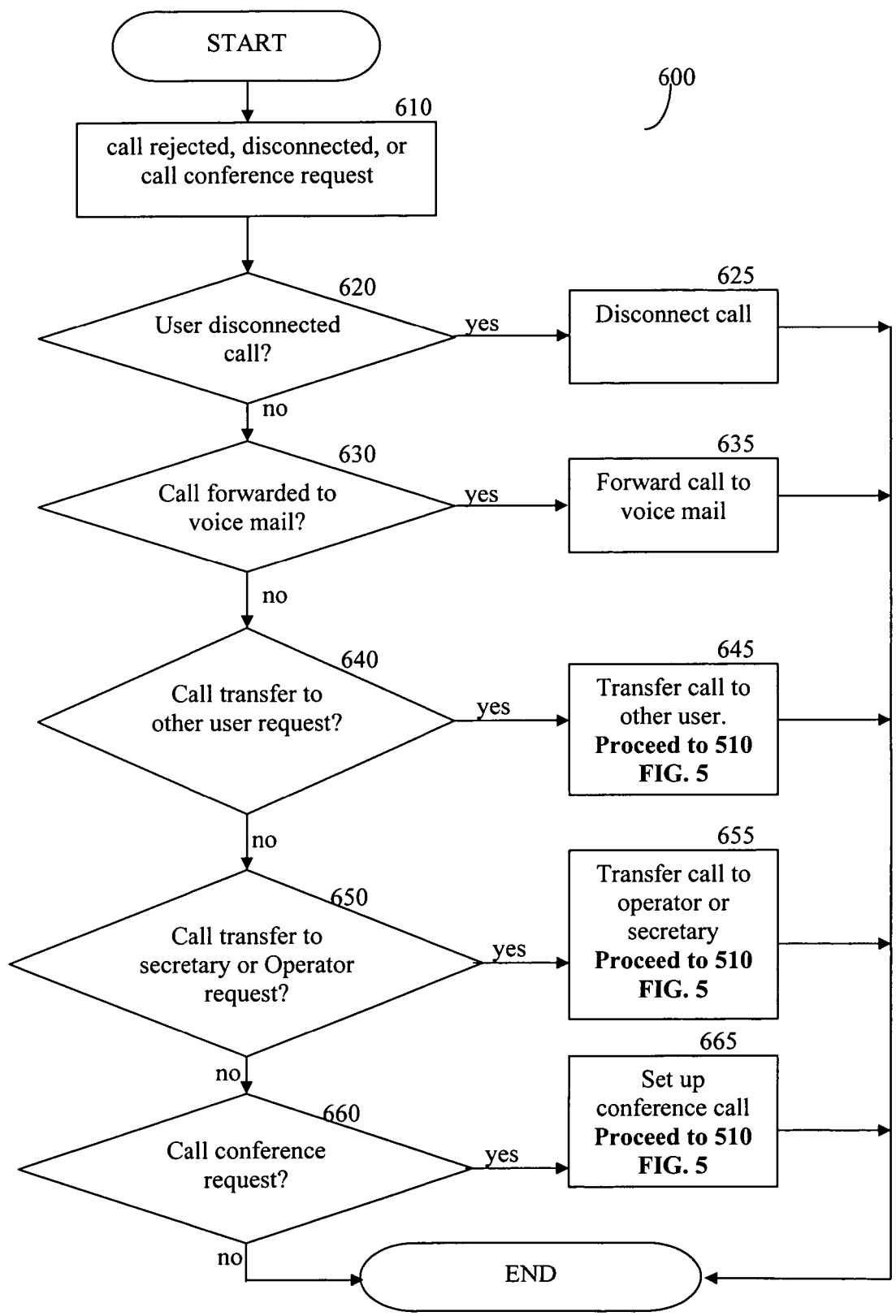
FIG. 6 is a block diagram illustrating the implementation of a method of USSD call rejection/forwarding by a WX subscriber.

The WX node 4 proceeds with the call in accordance with the principles disclosed with respect of FIG. 6.

During a call, multiple USSD messages can be sent between the WX node 4 and WX subscriber 10 to provide the ability to the WX subscriber 10 to choose the handling of calls with the option provided. Every WX subscriber 10 has a call option database. Call option database may be unique for a given WX subscriber 10, for a company, for any type of group or a system generic database.

FIG. 6 shows an exemplary and non-limiting flowchart 600 in which the WX node 4 requests the MSC 14 to perform the action sent by the WX subscriber 10 by means of a USSD message. The WX node 4 also sends USSD messages to the new WX subscriber 10 to provide information on the call. The WX subscriber can request from the WX node 4 to hold the call the WX subscriber 10 just received, and retrieve the call later. If the WX subscriber 10 is in call, the WX subscriber 10 can swap calls using USSD messages in accordance with the principles of the disclosed invention.

The USSD message sent by the WX subscriber 10 can indicate "disconnect call" (step 620). Upon receiving the USSD message from the WX subscriber 10, the WX node 4 informs the MSC 14 to disconnect the call (step 625). The USSD message may also instruct the WX node 4 to start a new call after the disconnect.

The USSD message sent by the WX subscriber 10 can indicate the call to be forwarded to the WX subscriber 10 own voicemail box (step 630). The WX node 4 then sends a message to the MSC 14 to connect the originating caller to the WX subscriber 10 voicemail box (step 635).

The USSD message sent by the WX subscriber 10 can indicate the call to be transferred to another WX subscriber 10 within the same company (step 640). The call is transferred to the new WX subscriber 10 with an optional USSD message (step 645). The USSD message may contain information about the caller with a request from the WX subscriber 10 sender to the new WX subscriber 10, such as "set up a meeting," "help the caller," and more. The call is processed as a new call connecting the original caller to the new WX subscriber 10. The WX node 4 proceeds with the call in accordance with the principles disclosed with respect of FIG. 5.

The USSD message sent by the WX subscriber 10 can request the call to be transferred from the current WX subscriber 10 to an attendant (step 650). At the same time WX node 4 sends a USSD message with the selected canned message which is then sent to the attendant's phone 10 "set a meeting" and the device status of the sending device 10. As a result of the transfer, WX subscriber 10 is disconnected from the call and the USSD session ends. The call is transferred to the attendant. Attendant (step 655) receives the call and receives the USSD message related to the call. The call is processed as a new call connecting the original caller to the attendant. The WX node 4 proceeds with the call in accordance with the principles disclosed with respect of FIG. 5.

The USSD message sent by the WX subscriber 10 can request to establish a conference with another party (step 660). The WX node 4 instructs the MSC 14 to establish the conference with the new party (step 665). The WX node can also send USSD messages to the new party with information about the caller with optional information from the WX subscriber 10 in accordance with the principles disclosed with respect of FIG. 5.

Figure 7:
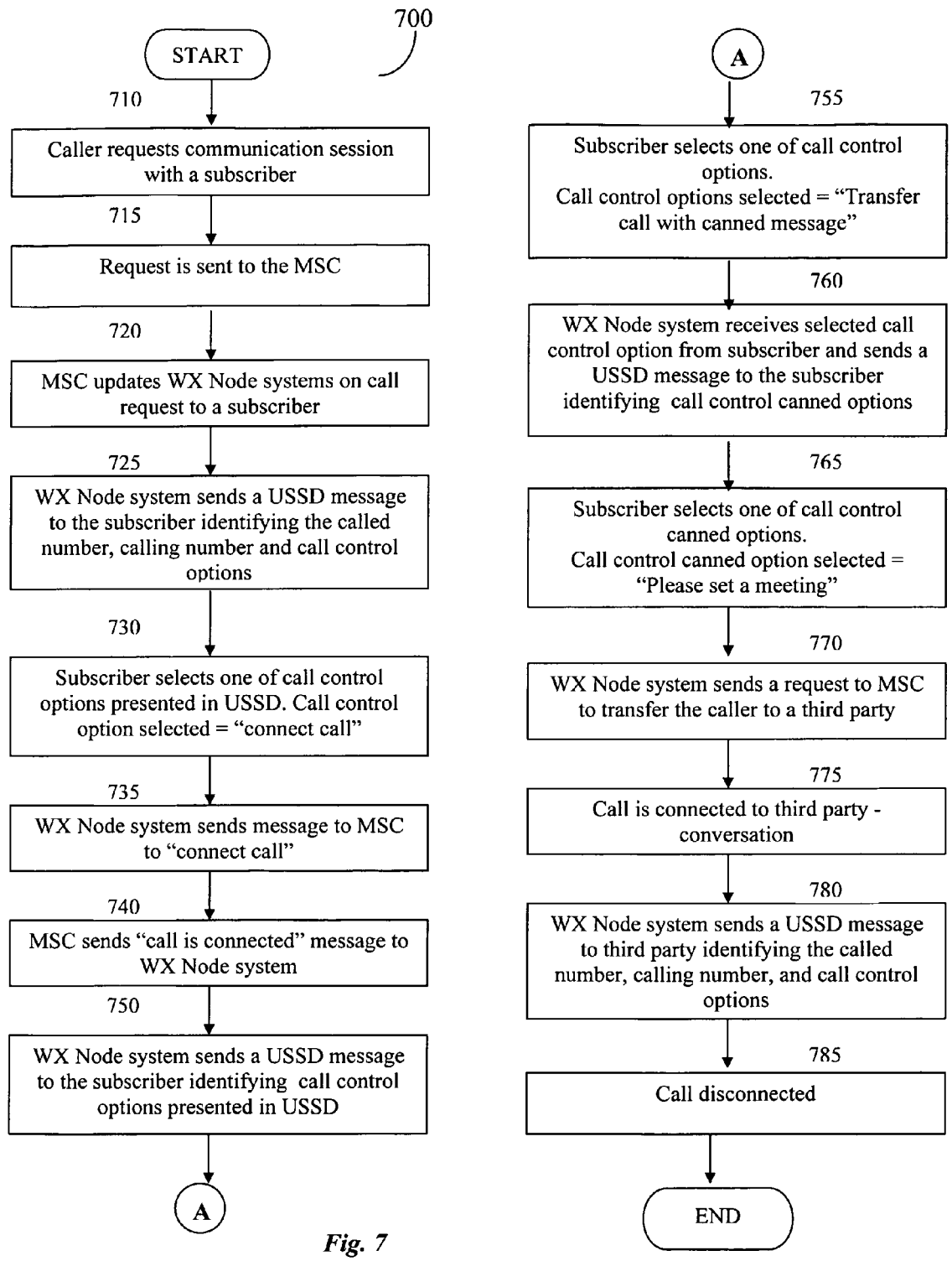
FIG. 7 is a block diagram illustrating the implementation of a method of interaction capabilities between a WX subscriber and the WX node to control the call by using USSD personalized WX subscriber canned messages during the call.

FIG. 7 shows an exemplary and non-limiting call, flowchart 700, in which WX subscriber 10 uses USSD canned messages to control and personalize a call being transferred to a WX subscriber 10.

As shown in the flowchart a request to establish a communication to a WX subscriber 10 is requested 710. Once the request 715 arrives at the MSC 14, the MSC 14 sends a message 720 to the WX node 4. The WX NODE 4 receives the request and sends a USSD message 725 to the WX subscriber 10. The message includes the caller number, calling number, dialed number and call control options list. Call control options list contains but not limited to options such as "connect call," "transfer call," "rejects call" and so on. Options sent to the WX subscriber 10 are determined by a database assigned to each WX subscriber 10 and selected by the WX Node 4 based on progress status of the call. The options in the database can be different for each WX subscriber 10. The WX subscriber 10 selects an option from the list and sends a USSD message 730 to the WX Node 4. In this exemplary call, the WX subscriber 10 selected option is to establish the call with the caller. Once the WX Node 4 receives the message, the WX Node 4 sends a message 735 to the MSC 14 to connect the call between the caller and the WX subscriber 10. The MSC 14 establishes the call and sends a message 740 to the WX Node indicating the call is connected. The WX Node 4 also sends another USSD message 750 to the WX subscriber 10 with a new call control options list. The option list can be one of but not limited to: transfer call, conference call, transfer call to <name>, consultation, hold, consult with <name>, transfer to <name> voice mail, transfer with canned message to <name>, send canned message, send interaction canned message. In this exemplary call, the WX subscriber 10 selects the option 755 to transfer the call to a subscriber named Jane with a canned message. Once the WX Node 4 receives the request message from the WX subscriber 10, the WX Node 4 sends a new USSD message 760 back to the WX subscriber 4 with a canned information option list. Canned messages provide the WX subscriber 10 with further control options for the handling of the call. Through the canned messages the WX subscriber 10 directs information to the party how to proceed with a request. Information such as but not limited to "set a meeting," "help the caller," "get a message" and so on. Multiple USSD canned messages can be communicated between the WX Node 4 and the WX subscriber 10 during a call. In this exemplary call, the WX subscriber 10 selects the option "set a meeting" and sends the USSD response message 765 to the WX Node 4. The WX Node 4 sends a message 770 to the MSC 14 to transfer the call to a third party. The transfer can be implemented via Intelligent Network (IN) protocol or via sending a USSD message to MSC 14 with the short codes for call transfer while spoofing the WX subscriber ID. For example, WX node 4 sends a string defined for transfer 4*, 4=third party number Jane, the MSC translates it as coming from the WX subscriber 10. In this exemplary call, WX subscriber 10 Jane is connected 775 to the caller. The WX Node 4 also sends a USSD message 780 to the WX subscriber 10, Jane, with call control options list. The list details include but are not limited to the caller, the transfer party, and the request from the transfer party to set up a meeting with the caller. The WX Node 4 can also send a USSD message options list message to a non wireless device phone. For example, if Jane has a VoIP SIP phone, the WX Node 4 converts message 780 to SIP and sends the USSD message data as part of the display attributes of the SIP, so the SIP phone can display the message. The message includes the following details, but not limited to, the caller, the transfer party, and the request from the transfer party to set up a meeting with the caller. WX subscriber 10 Jane converses with the caller, sets up a meeting and disconnects the call 785.

Figure 8:
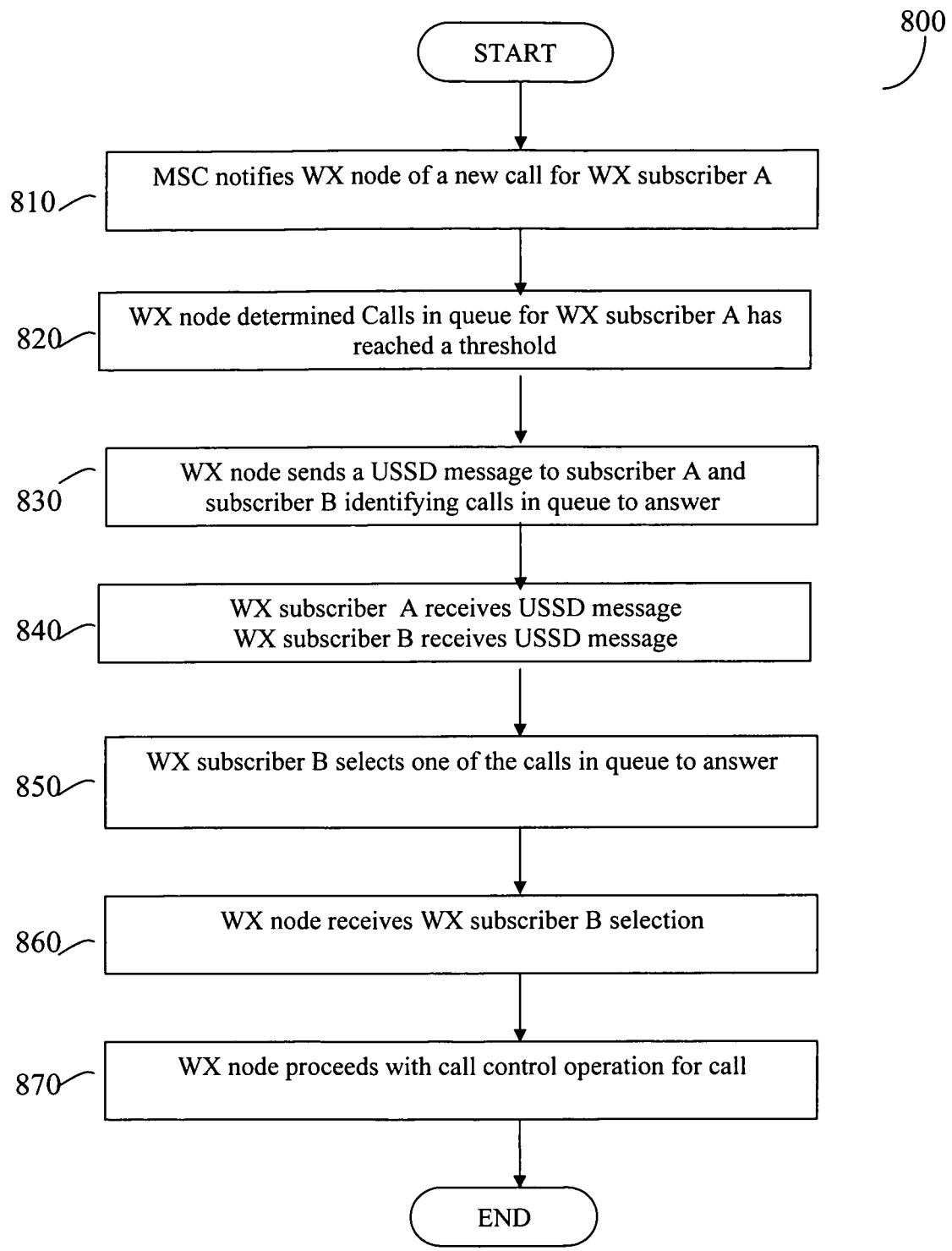
FIG. 8 is an exemplary call flow of a subscriber receiving a USSD message to process calls due to a number of calls waiting to be processed exceeding a threshold.

FIG. 8 shows an exemplary and non-limiting flowchart 800 in which WX subscriber 10 receives a USSD message with details of all calls waiting in a queue. The calls may be listed on the WX subscriber 10 queue or on a queue belonging to another WX subscriber 10. Each time there is a change in the WX subscriber queue, a new USSD message is sent to the WX subscriber 10. WX subscriber 10 can select any of the listed calls in queue and control interaction such as answer call, reject call, send canned message.

As shown in flowchart 800 MSC 14, receives new call request 810 for WX subscriber 10, subscriber 10 is in call and may have several calls in queue. MSC 14 sends a message 810 to the WX Node 4. The WX Node 4 receives the request 820 and determines that a number of calls in a queue has reached a threshold. The WX Node 4 sends a USSD message 830 to WX subscriber 10' and WX subscriber 10 indicating a new list and reaching the list threshold. The message 840 is received by both WX subscribers 10 and 10'. The message consists of the calls in queue, caller number, calling number and call control options list. In our exemplary call, Subscriber 10' selects one of the calls in queue 850 and responds with the selection to WX node 4. The WX node 4 sends a message 860 to the MSC 14 to connect the selected call with the WX subscriber 10'. The WX Node 4 proceeds with the call 870 in accordance with the principles disclosed with respect of FIG. 5.

Figure 9:
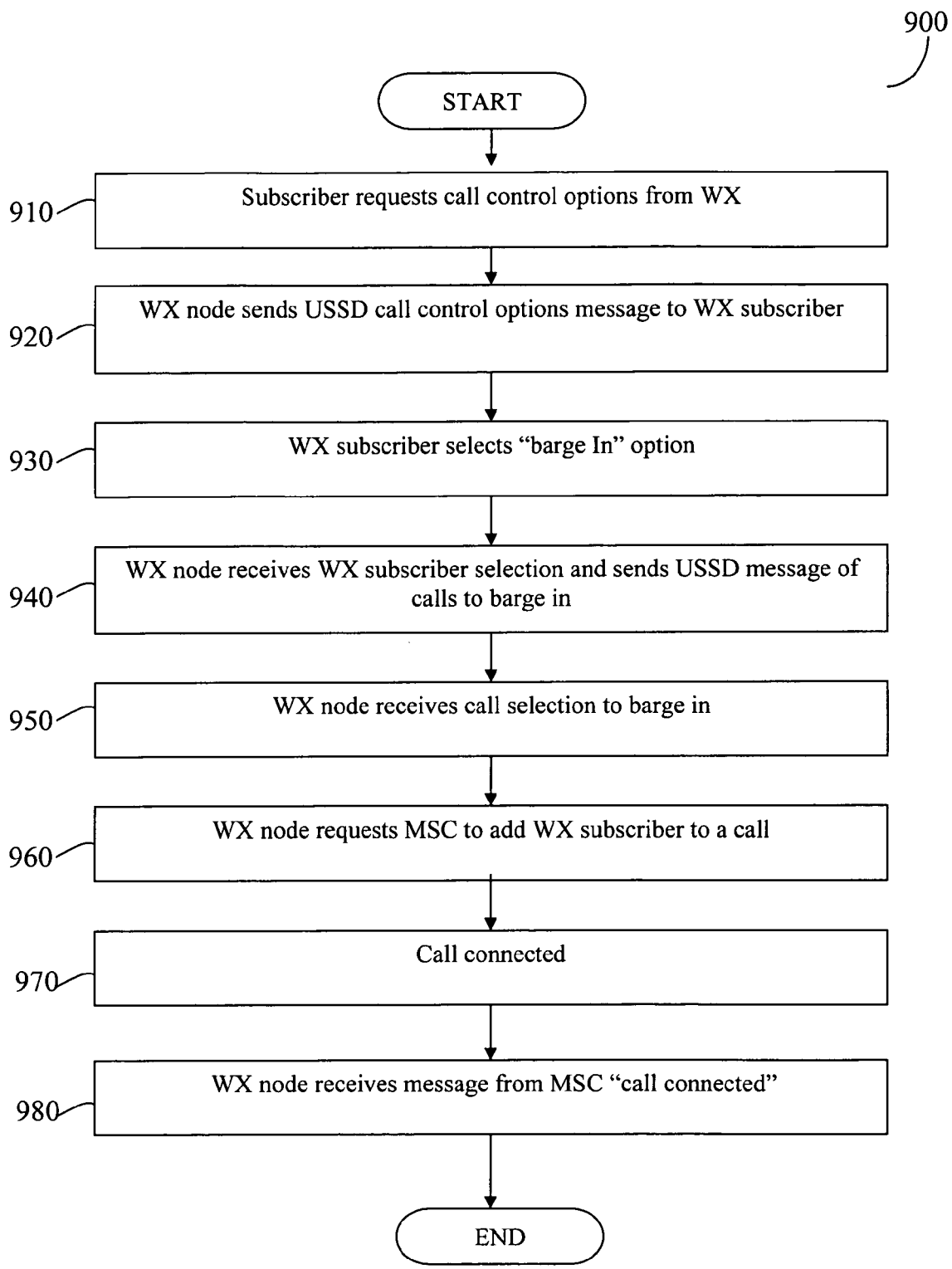
FIG. 9 is an exemplary call flow of a WX subscriber 10 "barge in."

FIG. 9 shows an exemplary and non-limiting flowchart 900 in which WX subscriber 10 receives a USSD message call control options such as "barge in," or silent monitor." WX subscriber 10 selects an option and sends the selection back to the WX node 4. The WX node 4 sends the WX subscriber a USSD message with a list detailing all calls, which subscriber 10 is allowed to operate with the selected option.

As shown in flowchart 900 subscriber 10 requests to receive call control options 910 from the WX Node 4. The request can be sent via a request to establish a new USSD session or via an established session. The request can be a predefined string sent to WX Node 4, requesting current call control options list. The WX Node 4 receives the request and sends a USSD message 920 to the WX subscriber 10. The message consists of call control interaction options which consists but not limited to options such as "barge-in," "silent monitor" and so on. The WX subscriber 10 selects an option from the list and sent a USSD message 930 to the WX Node 4. In this exemplary call, the WX subscriber 10 selects option "barge-in". Once the WX Node 4 receives the message, the WX Node 4 sends a message 940 with a list of potential calls which WX subscriber 10 can barge into. Options sent to the WX subscriber 10 are determined by a database assigned to each WX subscriber 10 and selected by the WX Node 4 based on progress status of the call. The options in the database can be different for each WX subscriber 10. The WX subscriber 10 selects a call from the list and sends a USSD message 950 to the WX Node 4. The WX Node 4 sends a message 960 to the MSC 14 to barge-in subscriber 10 to the selected call. The MSC 14 connects WX subscriber 10 to the selected call 970 and sends a message 980 to the WX Node 4 indicating the call is connected.

Figure 10:
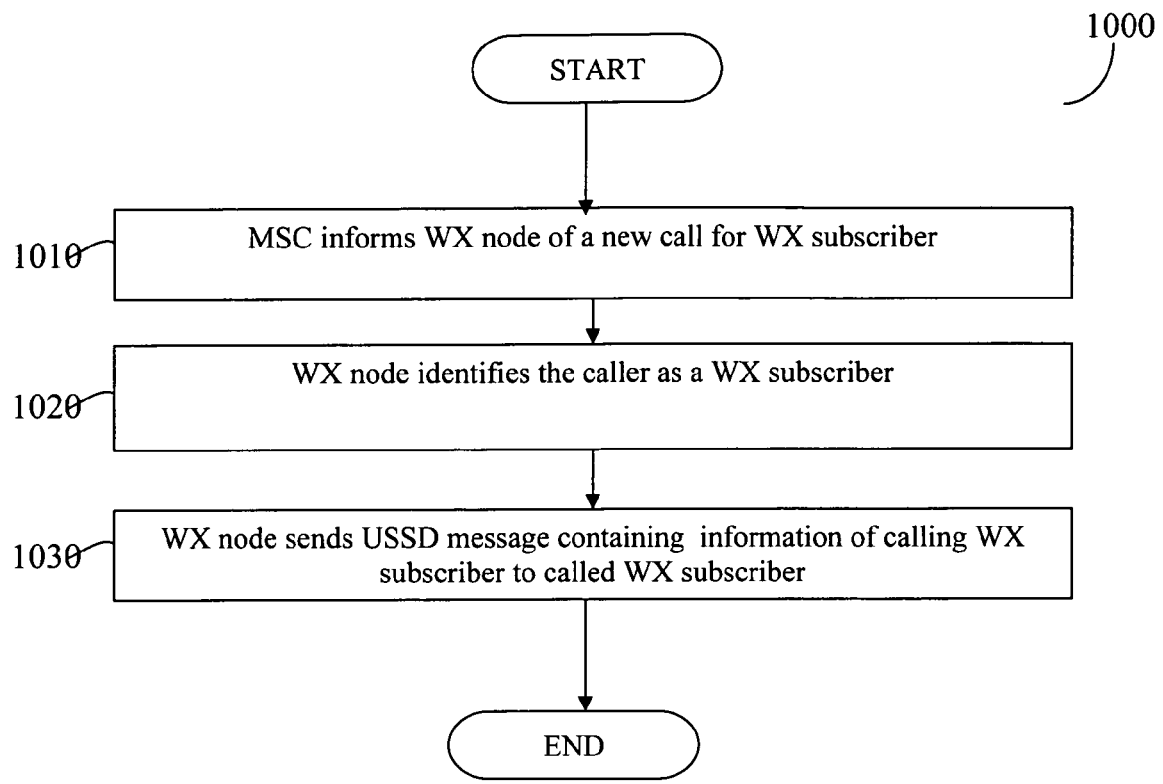
FIG. 10 is an exemplary call flow of caller information in an incoming call.

FIG. 10 shows an exemplary and non-limiting flowchart 1000 in which WX subscriber 10 receives a USSD message with details of the caller data stored in the WX database such as title of caller.

As shown in flowchart 1000, MSC 14 receives new call for WX subscriber 10. MSC 14 sends a message 1010 to the WX Node 4. The WX Node 4 receives the request and identifies the caller 1020. Caller is stated in the WX database as a caller which permits sending to other WX subscribers 10 additional information data. The permission to send additional information data and the type of data to be sent can be authorized by, but not limited to, the WX subscriber 10, or the company's WX subscriber 10 administrator. Additional information data options sent include, but are not limited to, are such as "Joe Cohen—VP Sales East Coast", "Jane Lipkin—052-123-4567", "customer support" and so on.

In this case caller requested to send "Joe Cohen—VP Sales East Coast". WX Node 4 sends USSD message 1030 to subscriber 10 with the additional data, as part of this message additional options can be sent including, but not limited to, options such as call control interaction, called number and so on.

In addition to the above, certain other features may be added as part of a wireless Centrex solution, for example:
  a. Location based services (LBS) related features routing based on location as described hereinbefore.
  b. E911—the system may provide 911 capabilities based on data collected from wireless operator network location system.
  c. Night service, weekend service, holiday service—various routing plans.
  d. Company wide feature enforcement and ability to create uniformity across all company wireless phones, for example, once any incoming call to any extension, was not answered and it is after 17:00, the call is transferred to a specific number. (enables people that are working after 17:00 to answer call, but if called does not answer, enables the company to have somebody handling the call).
  e. Door Bell group—open company door, could be limited to location (receive ring), time of the day, code to open door but can be applied from distance. In addition can use wireless device to view video picture via video camera at company door, recognize visitor and open door.
  f. Lock device—enterprise administrator can lock certain devices/lines via company web interface.
  g. Call one number (i.e. sales number) multi device wireless phones ring.
  h. Routing of calls to called number, which is abroad based on ANI (not based on code, or in addition to code—users will enter code or based on their ANI will be transferred to subscriber roaming).
  i. Routing of calls and content (e.g. video call or voice call) to a called number based on called number IMEI (International Mobile Equipment Identity).

Furthermore, when a new user is added to the organization, the company address book can be automatically updated and the company public address book OTA sent to the new user.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing appropriate software. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage. Other hardware, conventional and/or custom, may also be included. Similarly, any switches shown in the figures are conceptual only.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated that although various aspects of the invention have been described with respect to specific embodiments, alternatives and modifications will be apparent from the present disclosure, which are within the spirit and scope of the present invention as set forth in the following claims. For example, enterprise management can be done by web management or by any other method such as using wireless device, using voice call etc.) as long as the enterprise is provided with the ability to control and define how the routing of its employees' mobile devices will be implemented (i.e. set rules, create company wide features and parameters). It should be further noted that the teachings shown herein are also applicable when a user device initiates a communication with either a call center and/or another user device or devices.

What is claimed is:

1. A call control manager comprising:
   means for sending a first message using an Unstructured Supplementary Service Data (USSD) protocol to a first device, said first message alerts said first device of an incoming call from at least one second device and includes a first set of call options and call initiator information;
   means for receiving a first response message from said first device and responsive to a type of said first response message determining how to handle the call;
   means for exchanging USSD messages, during said call established between the at least one second device and the first device, with said first device and at least one second device, said USSD messages containing selection lists including a second set of call options sent to said first device and responses thereof received from said first device, when the type of the first response message is accepting said call with said second device;
   means for enabling barge-in to a call in progress; and
   means for causing a display of said selection lists on a display of said first device.

2. The call control manager of claim 1, further comprising:
   means for handling said call responsive of a type of said first response message by performing one of:
   forwarding said call to a voice mail if the type of the first response message is diverting said call to voice mail;
   disconnecting said call if the type of the first response message is rejection said call;
   transferring said call to an attendant device if the type of the first response message is rejecting said call with a message; and
   transferring said call to a second device if the type of the first response message is diverting said call to said second device, wherein said second device and said attendant device are part of a private network.

3. The call control manager of claim 1, wherein a call option of said second set of call options includes one of: transfer said call to a second device, transfer said call to a voicemail, add a second device to said call, a canned message.

4. The call control manager of claim 3, further comprising:
   means for resending a previously sent message responsive of a request from said first device.

5. The call control manager of claim 1, further comprising:
   means for determining call options of said second set of call options responsive of information about said first device.

6. The call control manager of claim 5, further comprising:
   means for retrieving said information about said first device from a database.

7. The call control manager of claim 1, further the
   means for causing the display also causing for the display of status on said display of said first device, said status is of a device communicating over a wireless network by exchanging one or more messages using the USSD protocol.

8. The call control manager of claim 1, further comprising:
   means for creating a new call.

9. The call control manager of claim 1, further comprising:
   means for swapping to another call.

10. The call control manager of claim 1, further comprising:
    means for enabling consultation with another subscriber.

11. The call control manager of claim 1, further comprising:
    means for enabling set up of a conference call.

12. The call control manager of claim 1, further comprising:
    means for updating an attendant device status.

13. A wireless exchange comprising the call control manager of claim 1.

14. The call control manager of claim 1, further comprising:
    an application interface for the integration to at least an enterprise business system.

15. The call control manager of claim 14, wherein said enterprise business system is at least one of: e-mail application, calendar application, a web service application.

16. A non-transitory computer readable medium having stored thereon instructions that when executed by a call control manager cause the call control manager to:
    send a first message using an Unstructured Supplementary Service Data (USSD) protocol to a device, said first message alerts said device of an incoming call from a caller and includes a first set of call options and call initiator information;

exchange, during an active call with the device and the caller, USSD protocol messages with the device, the messages containing selection lists including a plurality of options for handling the active call sent to the device and responses thereof received from the device, wherein the selection lists include at least one of: call control options, a canned message, status of other devices, and a device mode control;

send a barge-in call control message from said call control manager to said first device during a call in progress;

cause a display of said selection lists on a display of said device; and cause an execution of a selected option from the selection list.

17. A method of communicating with a device using Unstructured Supplementary Service Data (USSD) protocol messages, the method being performed by a call control manager, comprising:

sending a first message using an Unstructured Supplementary Service Data (USSD) protocol to a device, said first message alerts said device of an incoming call from a caller and includes a first set of call options and call initiator information;

exchanging, during an active call with the device and the caller, USSD protocol messages with said device, the messages containing selection lists including a plurality of options for handling the active call sent to the device and responses thereof received from the device, wherein the selection lists include at least one of: call control options, a canned message, status of other devices, and a device mode control;

sending a barge-in call control message from said call control manager to said first device during a call in progress;

causing a display of said selection lists on a display of said device; and causing an execution of a selected option from the selection list on said device.

18. The method of claim 17, wherein said selection lists include a list of voice messages retrieved from a mailbox owns by a subscriber of said device.

19. The method of claim 18, wherein said status is of a device communicating over a network by exchanging one or more messages with said call control manager using said USSD protocol.

* * * * *